(12) United States Patent
Goglanian

(10) Patent No.: US 6,291,002 B1
(45) Date of Patent: Sep. 18, 2001

(54) METHOD FOR PREPARING ELONGATED PITA BREAD

(75) Inventor: George Goglanian, Fountain Valley, CA (US)

(73) Assignee: Asgdhig Goglanian, Huntington Beach, CA (US)

(*) Notice: Subject to any disclaimer, the term of this patent is extended or adjusted under 35 U.S.C. 154(b) by 0 days.

(21) Appl. No.: 09/492,880

(22) Filed: Jan. 26, 2000

(51) Int. Cl.[7] .................................................. A21D 8/00
(52) U.S. Cl. .......................... 426/496; 426/138; 426/502; 426/523
(58) Field of Search .................... 426/496, 502, 426/516, 523, 138; 99/386, 443 C

(56) References Cited

U.S. PATENT DOCUMENTS

| | | |
|---|---|---|
| Re. 30,221 | 2/1980 | Moreno . |
| D. 252,536 | 8/1979 | Goglanian et al. . |
| 3,444,826 | 5/1969 | Seeder et al. . |
| 4,109,569 | 8/1978 | Kemper . |
| 4,116,120 | 9/1978 | Kemper . |
| 4,202,911 | 5/1980 | Papantoniou et al. . |
| 4,204,466 | 5/1980 | Schnee . |
| 4,264,635 | 4/1981 | Wilde . |
| 4,308,285 | 12/1981 | Hhn et al. . |
| 4,311,088 | 1/1982 | Hohn et al. . |
| 4,470,805 | 9/1984 | Gollan . |
| 4,597,979 | 7/1986 | Goglanian . |
| 4,698,228 | 10/1987 | Straka et al. . |
| 4,775,543 | 10/1988 | Mani . |
| 4,800,807 | 1/1989 | Mani . |
| 4,889,043 | 12/1989 | Mani . |
| 5,045,329 | 9/1991 | Goglanian . |
| 5,103,719 | 4/1992 | Mani . |
| 5,234,705 | 8/1993 | Mani . |
| 6,063,413 | * 5/2000 | Houraney et al. ............. 426/496 |

* cited by examiner

Primary Examiner—George C. Yeung
(74) Attorney, Agent, or Firm—Knobbe, Martens, Olson & Bear, LLP.

(57) ABSTRACT

The present invention is directed to a method and apparatus for baking substantially continuous pita bread and also for separating the upper and lower layers of such a continuous pita bread. A substantially continuous extrusion of dough is transported along a conveyor system and cut longitudinally into a series of elongated dough strips. The elongated strips are baked in an oven so that the strips inflate and become substantially tubular. When the baked tubular strips emerge from the oven, the upper layer and lower layers of the bread strips are detached from one another along their edges by a cutter assembly. The upper and lower elongated strips are thus separated and available for further processing, such as chopping into snack-sized portions and/or seasoning.

44 Claims, 12 Drawing Sheets

METHOD FOR PREPARING ELONGATED PITA BREAD

BACKGROUND OF THE INVENTION

1. Field of the Invention

The present invention relates to flatbreads and more particularly to a method and apparatus for preparing an elongated, substantially continuous pita bread.

2. Description of the Related Art

Flatbread is a common staple in Middle Eastern countries and, in recent years, has enjoyed considerably increasing popularity in other areas of the world. There are several types of flatbread, including lavash and pita bread. Pita bread, also known as pocket bread, has found a special popularity due in part to the convenience of using pita bread for making sandwiches. This is because the bread, when torn, forms a pocket which may be filled with meat, vegetables, cheese and other sandwich fixings. The pocket is formed between two outer layers which are easily separated by the user. The relative thinness of the layers is another attractive aspect of the bread.

The double layer form characteristic of pita bread results from its baking process. In this process, a rolled, flat dough disk is baked in an extremely hot oven, typically in excess of 500° F., on a flat support surface. The extreme heat initially sears the top, bottom and edge surfaces of the dough disk, thus creating a crust that at least partially seals these surfaces. As the dough between the surfaces heats up and bakes, gas and steam are liberated from the dough. This gas and steam is generated faster than it can escape through the crust; thus, pressure is created within the dough disk and the disk inflates. The inflation process separates the upper and lower surfaces of the bread so that the upper and lower layers bake separate from each other.

The popularity of pita bread has prompted a demand for additional flatbread products. For example, the relatively thin outer layers of baked pita bread can be used to manufacture a low-fat, yet pleasing chip-type snack food. One approach for creating such pita chips is to feed baked pita bread through a chopper, which chops the bread into snack-sized portions. This process involves extensive labor because individual baked pita bread loaves must be fed into the chopper. Additionally, the outer layers of each pita bread portion are joined to each other along an edge of the pita bread portion. A great deal of waste results from feeding individual pita bread portions through a chopper because the edges create incomplete snack portions that must be disposed of.

SUMMARY OF THE INVENTION

Accordingly, there is a need in the art for a method for preparing a two-layered pita bread that minimizes the amount of edge portions relative to the rest of the pita bread. Additionally, there is a need in the art for an apparatus and method for preparing pita chips in a manner that minimizes both waste and the labor required to manufacture the chips. Further, there is a need in the art for an apparatus and method for preparing an elongated, continuous pita bread.

In accordance with one aspect, the present invention comprises a method for making an elongated pita bread. The method includes forming dough into an elongated flat dough form and conveying the dough along a conveyor through an oven such that baking-induced gases inflate the dough, forming an upper bread layer and a lower bread layer. The layers are connected at first and second edges. The baked dough is cut adjacent the first edge so that the upper and lower layers are unattached at the first edge.

In accordance with another aspect, the present invention comprises an apparatus for manufacturing an elongated pita bread. A dough mixer is included and is adapted to supply dough to a conveyor system. A proofer is also provided. A plurality of rollers shape the dough into an elongated, substantially rectangular shape. An oven is provided and is adapted to bake the dough so that baking-induced gases inflate the dough, at least partially dividing the dough into upper and lower layers. An edge cutter is provided and is adapted to cut the baked dough between the upper and lower layers. In further embodiments, a chopper is provided to cut at least one of the layers into snack-sized portions.

In accordance with a still further aspect, the present invention comprises an apparatus for manufacturing pita bread. The apparatus includes a conveyor system, a proofer, means for forming a substantially continuous elongated sheet of dough, an oven for baking the dough so that the dough inflates during baking, and means for cutting the baked dough along opposing edges.

In accordance with yet another aspect, the present invention provides a method for making snack-sized portions of pita bread. A continuous elongated strip of pita dough is provided, along with a conveyor system and a proofing apparatus. An oven is provided and is adapted to bake the elongated pita dough strip to form an elongated pita bread strip having upper and lower bread layers. A chopper apparatus is provided and is adapted to cut the pita bread strip into snack-sized portions. The elongated pita strip is advanced along the conveyor system through the proofing apparatus, oven and chopper apparatus.

In accordance with another aspect, the present invention provides a method for making an elongated pita bread loaf. Pita dough is continuously extruded onto a conveyor system and continuously advanced through a first proofing apparatus, a rolling apparatus, and a second proofing apparatus. An oven is provided and is adapted to bake the pita dough so that the dough separates into upper and lower layers that are connected at opposing edges. The pita dough is continuously advanced along the conveyor system through the oven.

In accordance with yet another aspect, the present invention provides an elongated rectangular pita bread having a substantially uniform width, an upper and lower layer that are connected along first and second edges, and a length greater than its width.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENT

Figure 1:
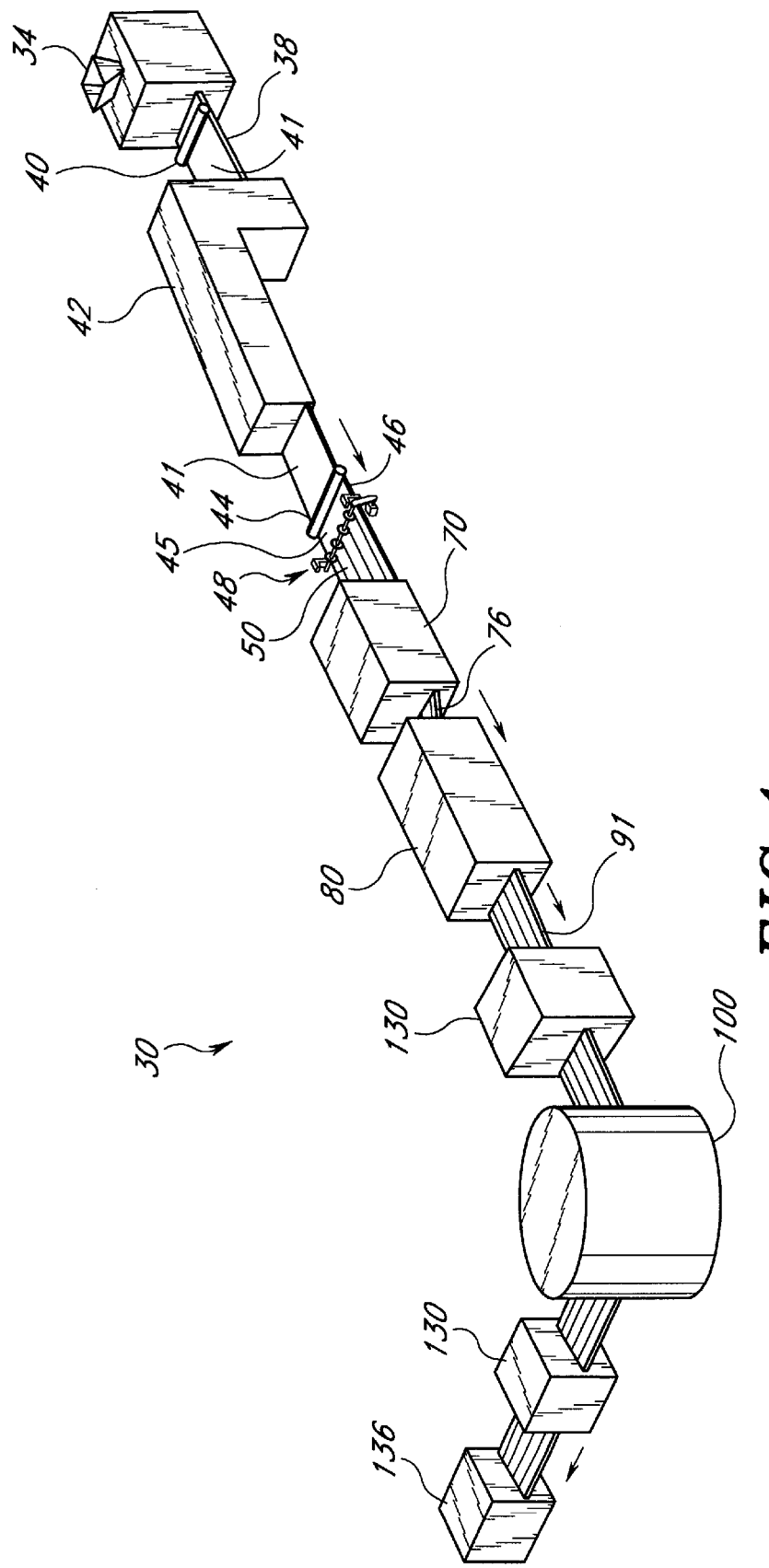
FIG. 1 is a schematic perspective view of an elongated pita bread manufacturing system.

With first reference to FIG. 1, a system 30 for manufacturing and baking elongated pita bread is shown schematically. In the illustrated embodiment, pita dough is fed into a hopper 34 which continuously extrudes the dough onto a conveyor 38 using an extrusion apparatus or continuous dough sheeter commercially available from several equipment manufacturers, such as Rademaker USA. The pita dough can be fed directly into the hopper 34 from a mixer (not shown) or can be allowed to rise for a time after mixing before being fed into the hopper.

The extrusion apparatus preferably forms the dough into a substantially flat shape. Alternatively, the conveyor 38 can transport the dough through a rolling apparatus 40, which rolls the dough into a substantially flat shape. The flattened dough 41 is next transported into an optional first rising area 42 or proofing apparatus which is depicted in more detail in FIG. 2. Within the proofer 42, the dough 41 is subjected to warm temperature so that it will further rise. The proofing apparatus 42 preferably comprises multiple conveyor belts 43 arranged to overlap each other so that the dough 41 is transported back and forth along the conveyor belts 43 in a serpentine manner while retaining its continuous, elongated shape.

With reference back to FIG. 1, after exiting the proofer 42, the dough 41 is preferably again rolled by a second rolling apparatus 44. In the illustrated embodiment, the fully rolled dough 45 is nearly the same width as the conveyor 46 and has a substantially uniform thickness. It is to be understood, however, that the dough 45 can be any width that fits appropriately onto the conveyor 46. The conveyor itself can have any manageable width, such as about 36, 48 or 60 inches. Preferably, the width of the dough is about 48 inches and the thickness is about $1/16-3/8$ inches.

Figure 3:
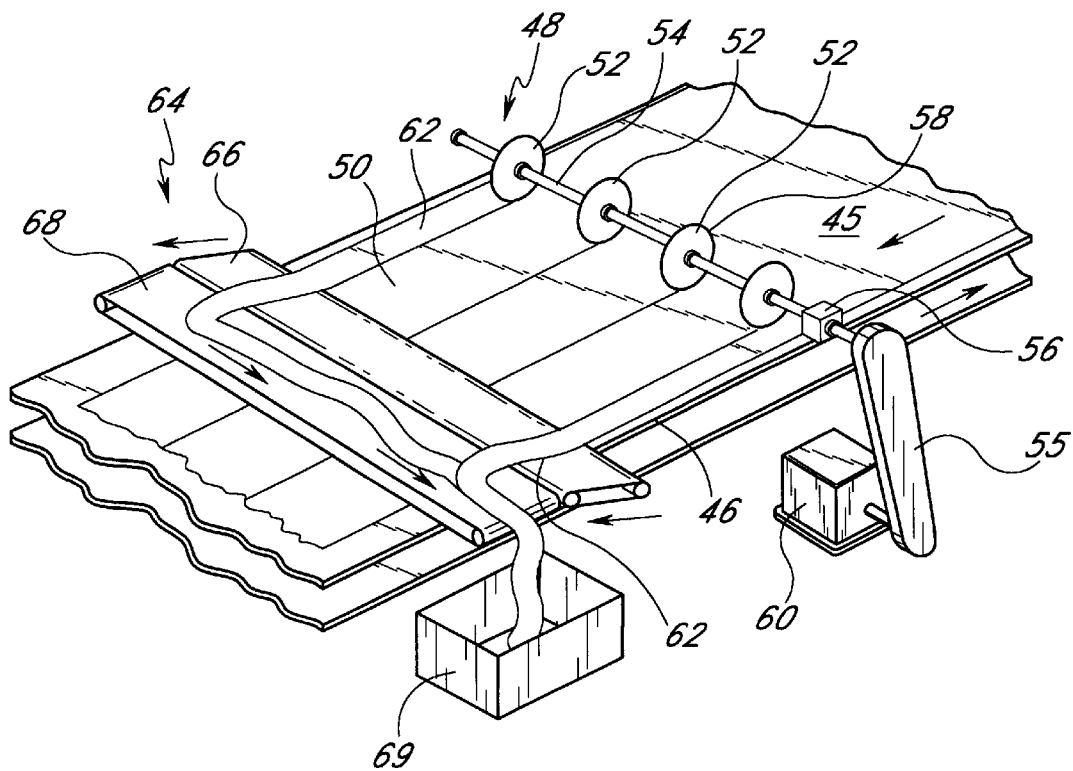
FIG. 3 is an enlarged perspective view of a dough cutting portion of the system of FIG. 1.

With reference also to FIG. 3, after the dough has been rolled, it is preferably transported along the conveyor 46 to a dough cutting apparatus 48. The dough cutting apparatus 48 is adapted to longitudinally cut the continuous extrusion of dough into portions 50 about 8 to 20 inches wide, and most preferably about 10 to 16 inches wide. In the illustrated embodiment, the elongated dough strips 50 are about 12 inches wide. Surplus dough 62 not included in the strips 50 is removed from the conveyor 46 and later fed into the hopper 34 for reprocessing. It is to be understood that the rolled dough could be left uncut, or could be cut into any number of longitudinal portions.

The dough cutting apparatus 48 preferably comprises a series of disc-shaped blades 52 mounted onto an axle 54. The blades 52 are spaced from each other a distance equal to the desired width of the elongated dough strips 50. The axle 54 is held in a linearly fixed position relative to the conveyor by a bearing 56. The cutting discs 52 are adapted to rotate so that the cutting edge 58 on the perimeter of each disc 52 moves at substantially the same linear speed as the conveyor belt 46. The cutting edges 58 contact and roll upon the conveyor belt 46. Thus, a complete cut through the dough 45 is achieved. Tests demonstrate that such cutting is sufficient to keep the strips 50 separated during subsequent processing and baking of the strips.

In the illustrated embodiment, a motor 60 drives the axle 54 through a belt 55 to ensure that the discs are rotating at the desired speed. In an alternative embodiment, the axle 54 is not powered and the discs 52 rotate by friction with the conveyor 46. In a still further embodiment, the axle is driven by the conveyor 46.

Figure 4:
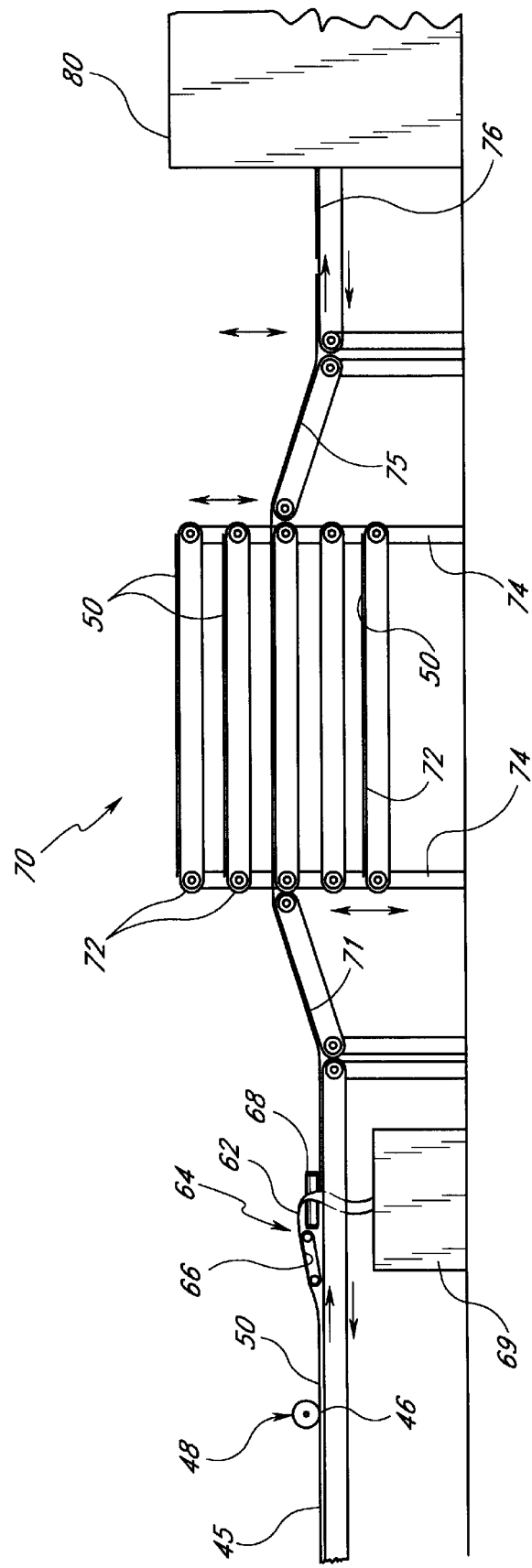
FIG. 4 is a side view of a dough cutting, proofing and oven section of the system of FIG. 1.

The illustrated embodiment employs four cutting discs 52 that are adapted to form three side-by-side elongated dough strips 50. As discussed above, although the illustrated embodiment comprises three dough strips, it is to be understood that any number of dough strips can be employed. Surplus dough 62 at either side of the elongated strips 50 is removed from the conveyor 46 by a removal conveyor system 64. With reference specifically to FIG. 4, the removal conveyor system 64 includes an upwardly-directed conveyor 66 and a transverse conveyor 68. The surplus dough 62 is directed from the cutting conveyor 46 onto the upwardly-directed conveyor 66, which delivers the surplus dough 62 to the transverse conveyor 68. The transverse conveyor 68 delivers the surplus dough 62 to a container 69. As discussed above, the surplus dough 62 may then advantageously be fed into the hopper 34 for reprocessing. Preferably, the upwardly-directed conveyor 66 and transverse conveyor 68 run at substantially the same speed as the main cutting conveyor 46. These conveyors can be driven off of the main conveyor or by separate motors.

With reference next to FIGS. 1 and 4, after the elongated strips 50 have been cut, they are transported along the conveyor to a second proofer 70. As with the first proofer 42, the second proofer 70 enables the dough 50 to rise in a relatively warm environment for a time before further processing.

In the illustrated embodiment, the second proofer 70 comprises a series of substantially horizontal conveyor belts 72 mounted on a frame 74 and oriented vertically relative to each other. A first guide conveyor 71 directs dough from the cutter conveyor 46 onto one of the conveyor belts 72. The first guide conveyor 71 is pivotable so that it can be aligned with each conveyor belt 72 in turn. A second guide conveyor 75 is also privotable so that it also can be aligned with each conveyor belt 72 in turn. The second guide conveyor 75 communicates dough from the conveyor belt 72 onto an adjacent oven conveyor 76.

The second proofer conveyors 72 are adapted to accept relatively long sections of dough. For example, the conveyors 72 are preferably about 20 to 100 feet in length, but can be even longer if space permits. Each conveyor 72 can accommodate dough strips 50 having about the same length as the conveyor 72.

In operation, elongated dough strips 50 from the cutter conveyor 46 are fed onto one of the proofer conveyors 72 and are drawn into the proofer 70 by the proofer conveyor 72 until the dough strip 50 fills the length of the proofer conveyor 72. The dough strips 50 are transversely cut to a length which will fill the conveyor 72. The dough strips 50 can be transversely cut by any means, such as by hand, by a cutting disk (not shown) that moves transversely relative to the conveyor 46, by a "guillotine" type cutter, or even by an intermittently-operating "paddle wheel" type roller cutter such as the cutter 78 illustrated in FIG. 5. When filled, the proofer conveyor 72 stops and the guide conveyors 71, 75 pivot to align themselves with another proofer conveyor 72. The next proofer conveyor 72 is then loaded in the same manner as discussed above.

During the time each of the proofer conveyors 72 receives a dough strip 50, dough strips already received by other proofer conveyors 72 lay idle, rising.

After each of the proofer conveyors has been filled with dough strips, the guide conveyors 71, 75 align the first-filled proofer conveyor with the cutting conveyor 46 and oven conveyor 76 again. Dough strips from the cutting conveyor 46 are directed along the first guide conveyor 71 and onto the proofer conveyor 72 and the dough strips that have already been allowed to rise on the proofer conveyor are directed onto the second guide catheter 75 and further onto the adjacent oven conveyor 76. Thus, the dough strips from the cutting conveyor 46 take the place of the dough strips that were already in the proofer conveyor 72. In this manner, dough strips are continuously being proofed and replaced within the proofer 70.

In an alternative preferred embodiment, the second proofer, like the first proofer discussed above and illustrated in FIG. 2, comprises a series of conveyor belts arranged so that the elongated dough strips remain substantially continuous and are never transversely cut as they follow a serpentine track through the proofer.

Figure 6:
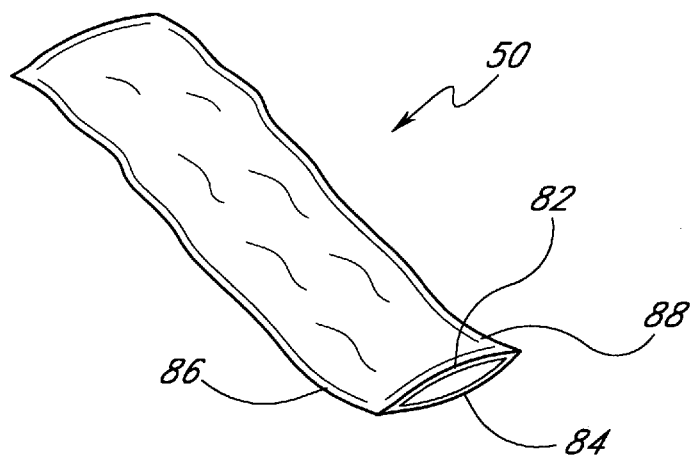
FIG. 6 is a cut away perspective view of a portion of elongated pita bread shown during the baking process.

The oven conveyor 76 transports the elongated dough strips 50 through an oven 80. As discussed above, the oven 80 is preferably maintained at high temperatures, such as about 500–1,200° F. or more. Such high temperatures provide an ideal environment for baking pita bread. When baked in the oven 80, a crust is initially formed, thus at least partially sealing the outer surface. As the rest of the dough bakes, gas and steam are liberated within the dough. This gas and steam is created faster than it can dissipate from the dough, thus generating pressure that inflates the bread. With next reference to FIG. 6, due to their elongated character, the strips 50 become substantially tubular when they inflate. The inflated strips 50 separate into upper and lower layers 82, 84. The layers are attached along first and second edges 86, 88.

Figure 7:
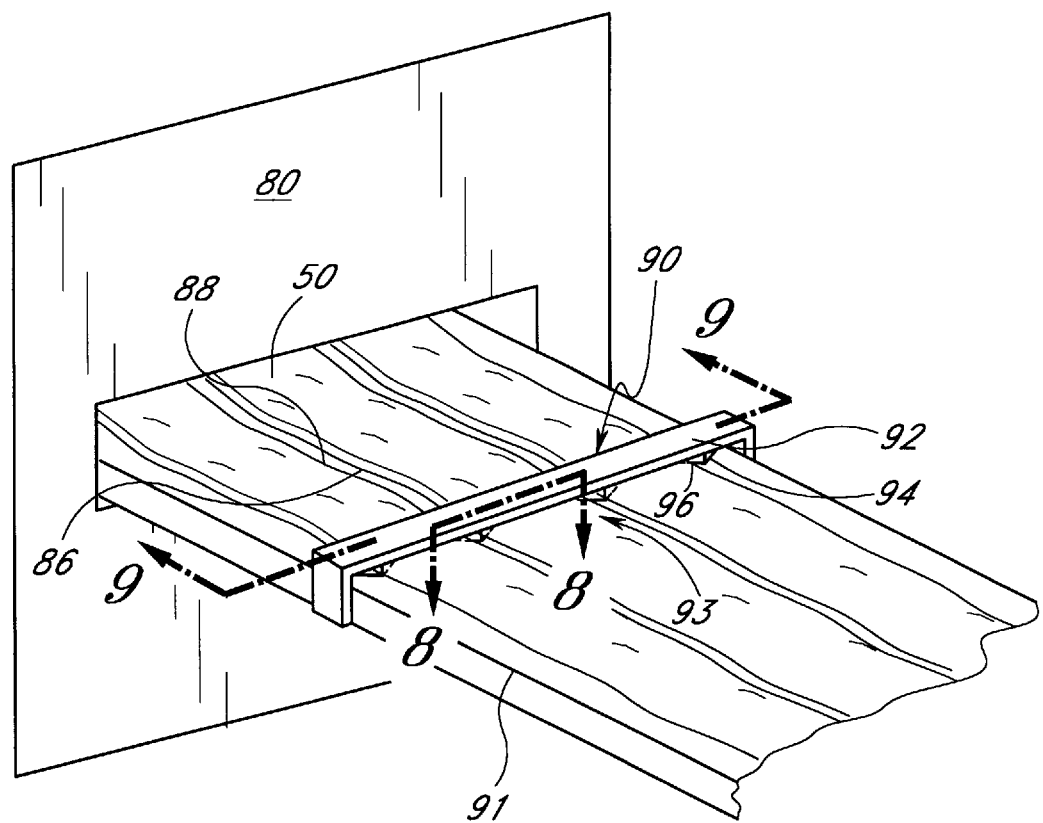
FIG. 7 is a perspective view of an after-oven cutting portion of the system of FIG. 1.

With next reference to FIG. 7, as baked pita bread exits the oven, the pita strips 50 remain in a substantially tubular inflated attitude. A cutter system 90 is preferably positioned along the conveyor 91 after the oven 80 and is adapted to cut each of the inflated pita strips 50 along the edges 86, 88 while the bread is still warm and easily cut. Cutting the edges 86, 88 detaches the upper and lower layers 82, 84 from each other and allows the gases and steam to escape, causing the pita bread to slowly deflate after passing the cutter system 90. Upstream of the cutters, however, the newly-baked pita strips remain substantially inflated. Once the upper and lower layers 82, 84 have been detached from each other, they can be further processed individually. Although the pita bread edges 86, 88 are cut immediately after baking in the illustrated embodiment, it is contemplated that the edges 86, 88 can be cut any time after baking, even after the strips 50 are completely deflated.

Figure 8:
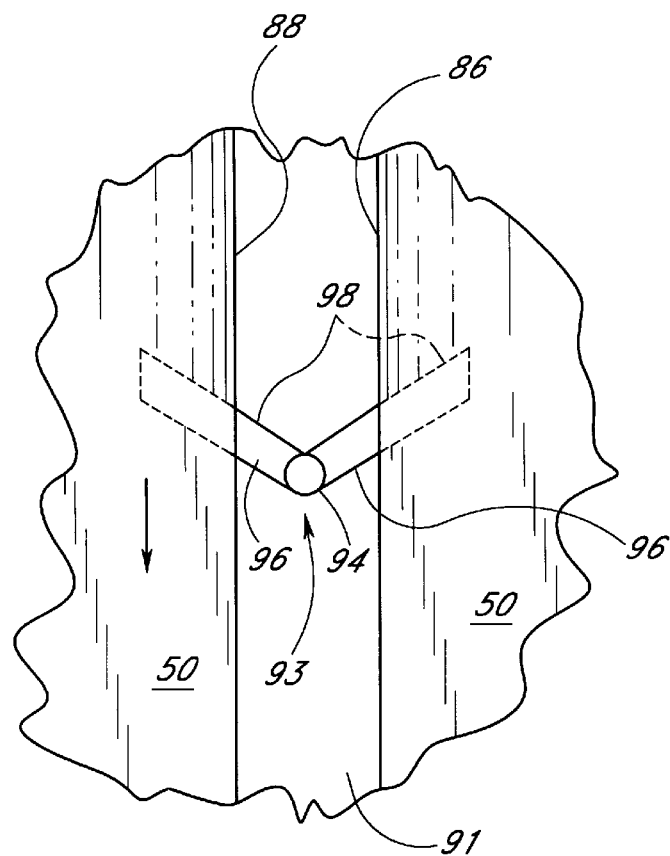
FIG. 8 is a close-up top view of one of the cutters shown on FIG. 7.
Figure 9:
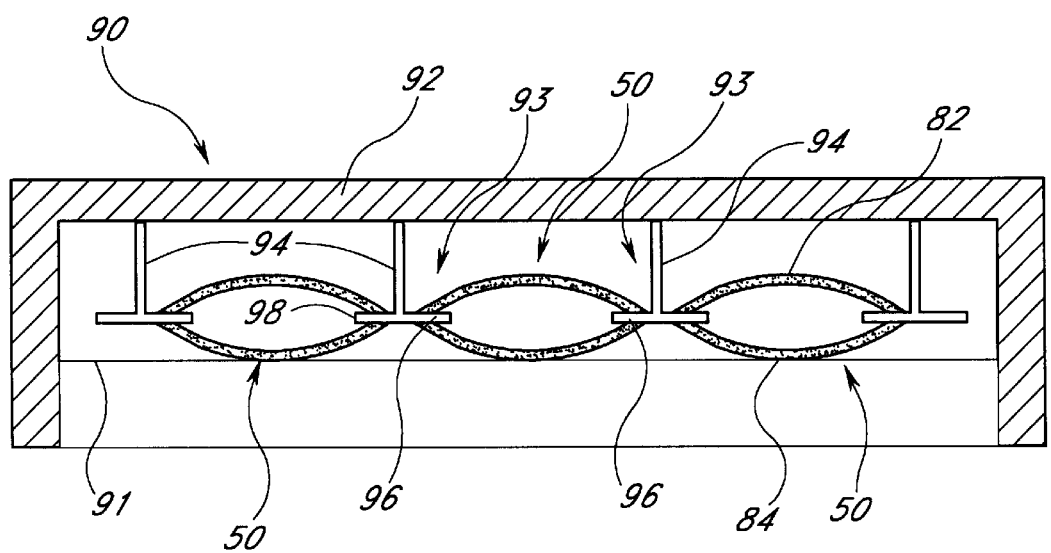
FIG. 9 is a cross-sectional view of a portion of FIG. 7 taken along line 8—8.

As illustrated in FIGS. 7–9, the cutter system 90 includes an over-conveyor crossbar 92 having a series of cutting stations 93. Each cutting station 93 comprises a support 94 that depends from the crossbar 92 and is positioned so as to lie adjacent the edges 86, 88 of the baked bread strips 50. Arms 96 extend outwardly from the supports 94 and have blades 98 attached thereto. The blades 98 are attached to the arms 96 by any means such as, for example, by conventional fasteners, and are positioned so that each inflated pita strip 50 is cut at its edges 86, 88, thus disconnecting the upper layer 82 from the lower layer 84. With specific reference to FIG. 8, the arms 96 preferably extend in an angularly forward direction and through the edges 86, 88 of adjacent baked bread strips 50.

In an alternative embodiment, the after-oven conveyor includes a traction device to increase the friction between the baked bread strips 50 and the conveyor. The increased friction helps the conveyor pull the bread strip through the cutter system 93. In one embodiment, the traction device is embedded in the conveyor, which has a series of holes formed therethrough and a source of vacuum creating a negative pressure through the holes. The bread strips are thus held in place on the conveyor by the negative pressure.

Each length of baked tubular pita bread will be closed at its front and rear ends as it comes out of the oven. Preferably, the front end is cut open before encountering the cutter system 90; however, this is not required for the cutter system to operate effectively. If desired, the front ends may be cut by any means, such as by hand or by a disc-shaped cutter that moves transversely relative to the conveyor 91.

Figure 10:
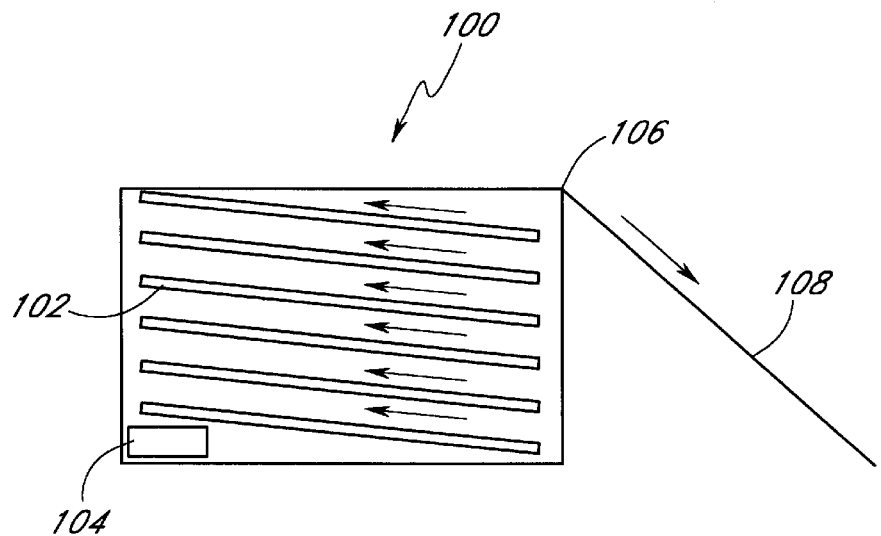
FIG. 10 is a schematic side view of a cooling portion of the system of FIG. 1.
Figure 11:
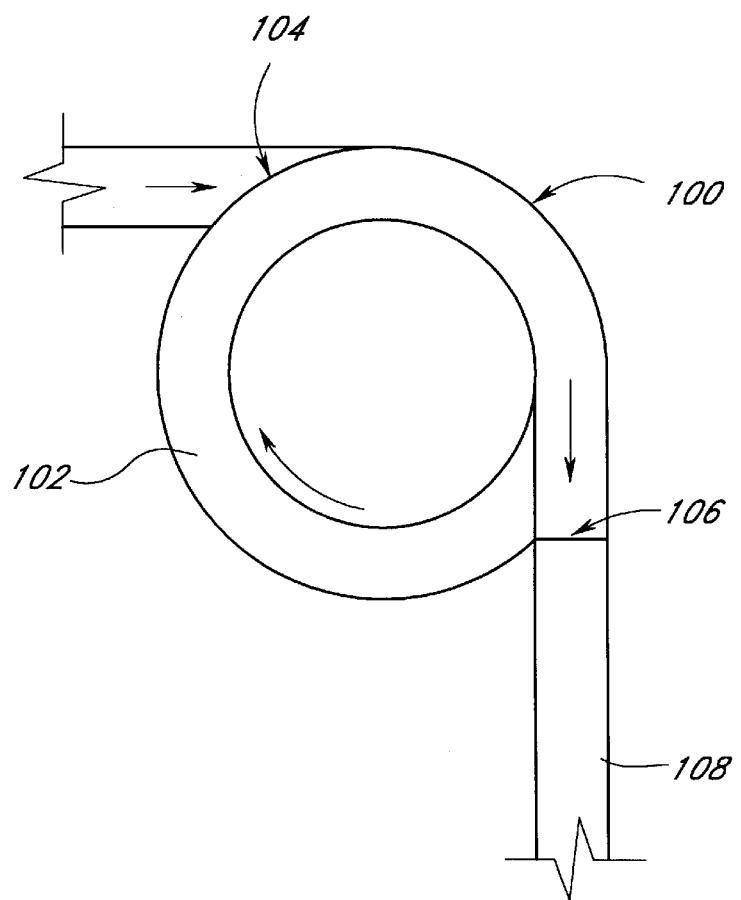
FIG. 11 is a schematic top view of the cooling system of FIG. 10.

After the elongated pita bread strips 50 have been baked and cut, they are preferably allowed to cool. FIGS. 10 and 11 schematically show a cooling tower 100 adapted for such use. The cooling tower 100 includes an upwardly-spiraling conveyor 102. Flatbread strips 50 enter the cooling tower 100 at an entry point 104 and cool during the time it takes to travel to an exit point 106 at the top of the tower. The strips exit the cooling tower 100 and proceed down a ramp 108 for further processing. The spiraling conveyor 102 is preferably about 48 inches wide and the outer diameter of the cooling tower is preferably about twenty-five feet. To properly move up the spiraling conveyor 102, the elongated strips 50 are preferably cut into sections that are about 60 feet long or less. Most preferably, the sections are about 40 feet long or less. Of course, the strips 50 may have already been cut to fit into the second proofer 70. However, if the second proofer is of a type adapted to preserve the substantially continuous nature of the dough strips 50, such cutting of the baked strips may be necessary.

Figure 2:
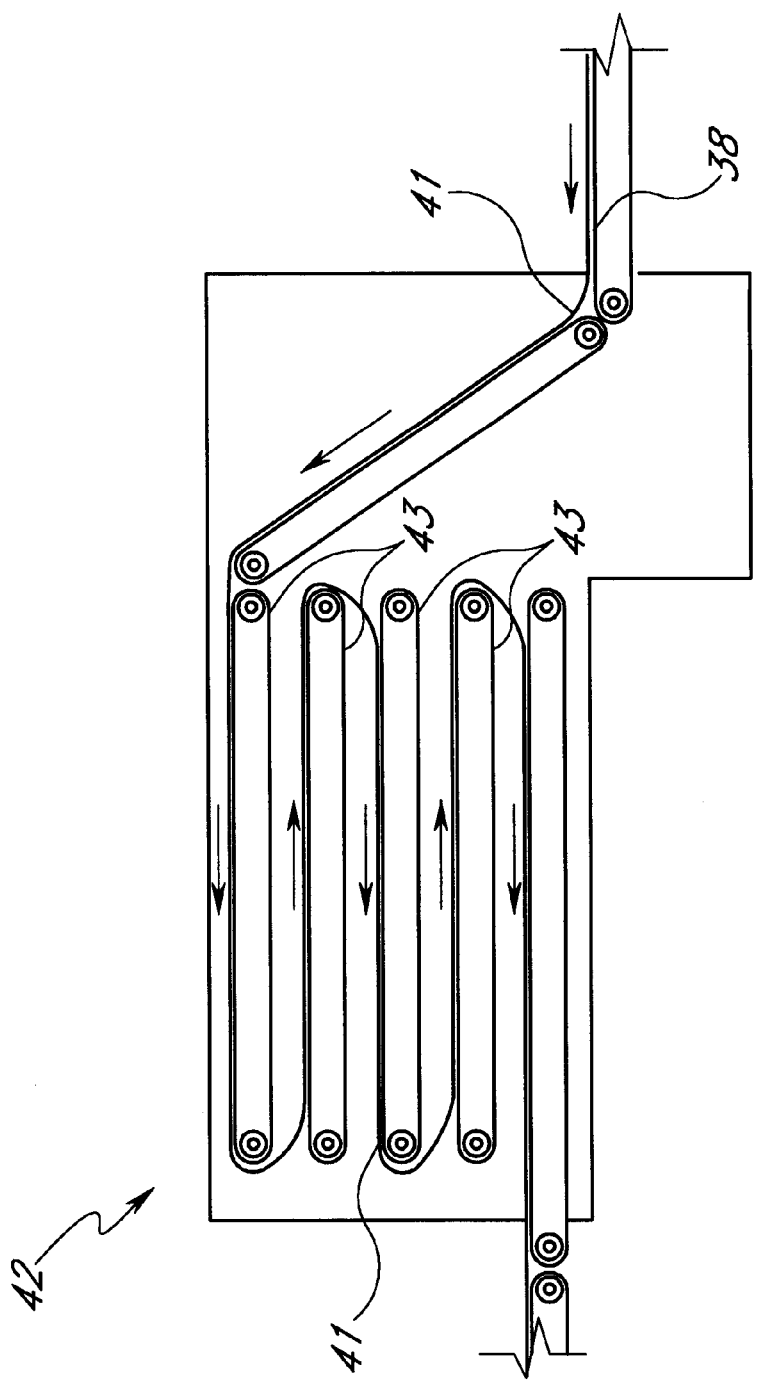
FIG. 2 is a side schematic view of a proofing apparatus of the system of FIG. 1.

In an alternative embodiment, the cooling tower has a multi-conveyor construction similar to that found in the first proofer 42 depicted in FIG. 2. In this embodiment, multiple conveyors are arranged vertically relatively to each other so that the elongated strips of baked pita bread are transported back and forth along the conveyor belts in a continuous, serpentine manner. In this cooling tower embodiment, the elongated strips need not be any particular length to appropriately be accommodated by the cooling tower.

Figure 12:
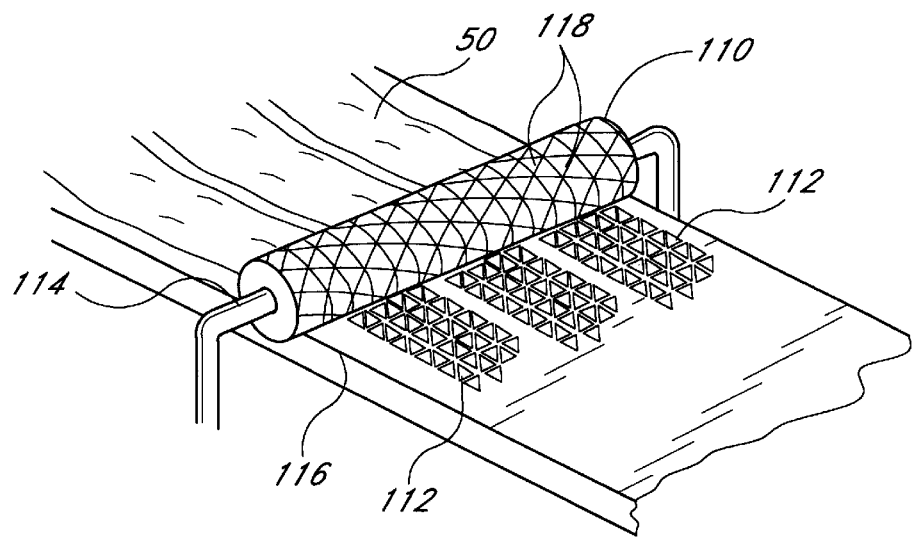
FIG. 12 is a perspective view of a chip cutting portion of the system of FIG. 1.

After the baked and cut flatbread has been cooled, it can be further processed in various manners, as desired. For example, the flatbread can be chopped into snacksized chips. FIG. 12 shows a cutting drum 110 adapted to cut or chop the layers of flatbread into snack portions 112.

The cutting drum 110 is preferably a die-cut type roller cutter rotatably mounted on an axle 114 and is adapted to roll upon a moving conveyor 116. Alternatively, a rolling anvil can be used with the cutting drum. Cutting surfaces 118 are provided on the cutting drum 110 so that when baked bread strips 50 on the conveyor 116 pass under the cutting drum 110, they are cut into desired shapes such as, for example, triangular chips having sides about 3 inches long, or rectangular strips about 1–2 inches wide and 3–6 inches long. Pita strips 50 may be fed into the cutting drum 110 manually or as part of the conveyor system. Additionally, single or multiple layers of elongated bread strips 50 may be cut by the cutting drum 110 at the same time.

Figure 13:
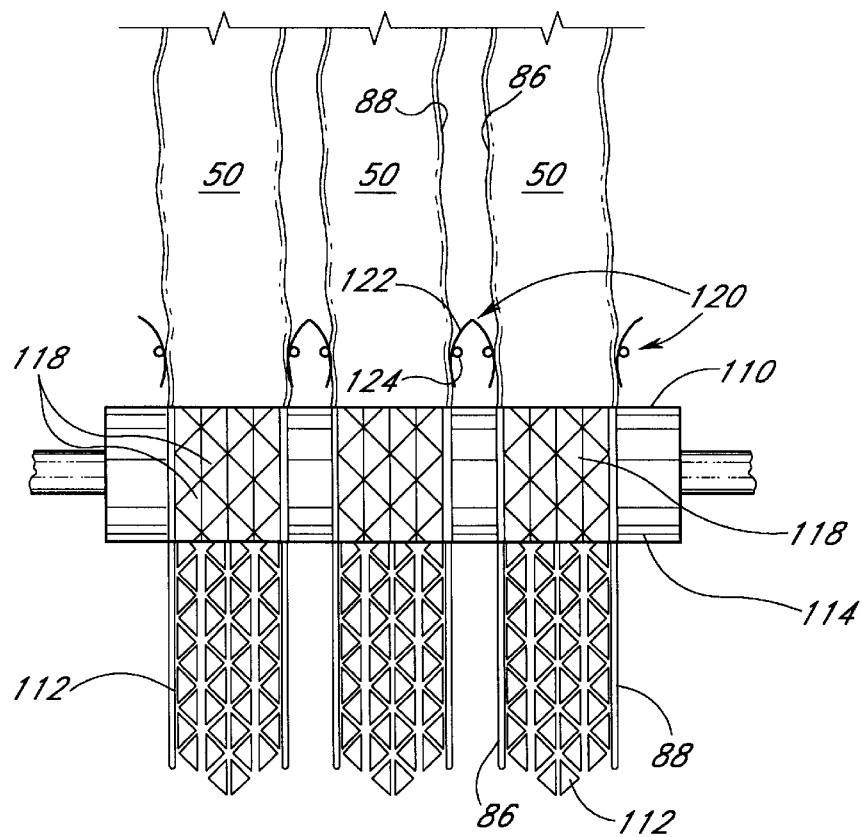
FIG. 13 is a top view of another embodiment of a chip cutting portion of the system of FIG. 1.

To minimize waste associated with misfeeding and to minimize labor costs associated with manual feeding, the cutting drum 110 may be combined with alignment members 120, as shown in FIG. 13. The alignment members 120 preferably include an arcuate guide portion 122 that is connected to a support 124. The support can be mounted according to any known method, such as depending from an overhead bar or extending upwardly between adjacent elongated conveyor sections. Opposing alignment members 120 align the bread strips 50 with the cutting blades 118 of the cutting drum 110 so as to obtain the maximum number of full-size chips 112 from each strip 50. Additionally, manual labor is not required to correctly feed the elongated strips 50 into the cutting drum 110.

In a preferred embodiment, a cutting drum 110 is used with alignment members 120 to process the tubular pita strips 50 into triangular chips 112 without an after-oven cutting system. The alignment members 120 ensure proper alignment of the baked pita strips 50 with the cutting surfaces 118 of the drum 110 so that a maximum number of chips 112 are obtained. Also, the cutting surfaces 118 of the cutting drum 112 can be positioned so that the edges 86, 88 of the baked pita strips 50 are removed by the cutting surfaces 118 at the same time the chips 112 are cut. In this manner, the upper and lower layers 82, 84 of the chips are cut at the same time and the step of cutting the edges 86, 88 is avoided.

In an alternative embodiment, the chopper apparatus comprises two cutting drums (not shown) arranged in series to cut the baked pita strips one after the other. The first cutting drum is adapted to partially chop the pita strips; the second cutting drum also partially chops the pita strips. Although each drum only partially chops the strips, the two drums combine to completely chop the strips into a desired snack portion shape. Employing two drums in this manner can reduce the likelihood that chopped portions of the baked strips will foul the chopper apparatus.

After the bread has been chopped into chips, the chips may be further processed in any desired manner. For example, the chips may be seasoned with various seasonings, as desired, and then packaged for sale.

With reference back to FIG. 1, processing stations 130 may be located before or after the cooling tower 100 along the system 30. This is because further processing, such as chopping, drying and seasoning, can take place before the baked bread is fully cooled as well as after. Apparatus for such further processing can be located at one of the processing stations 130.

Figure 14:
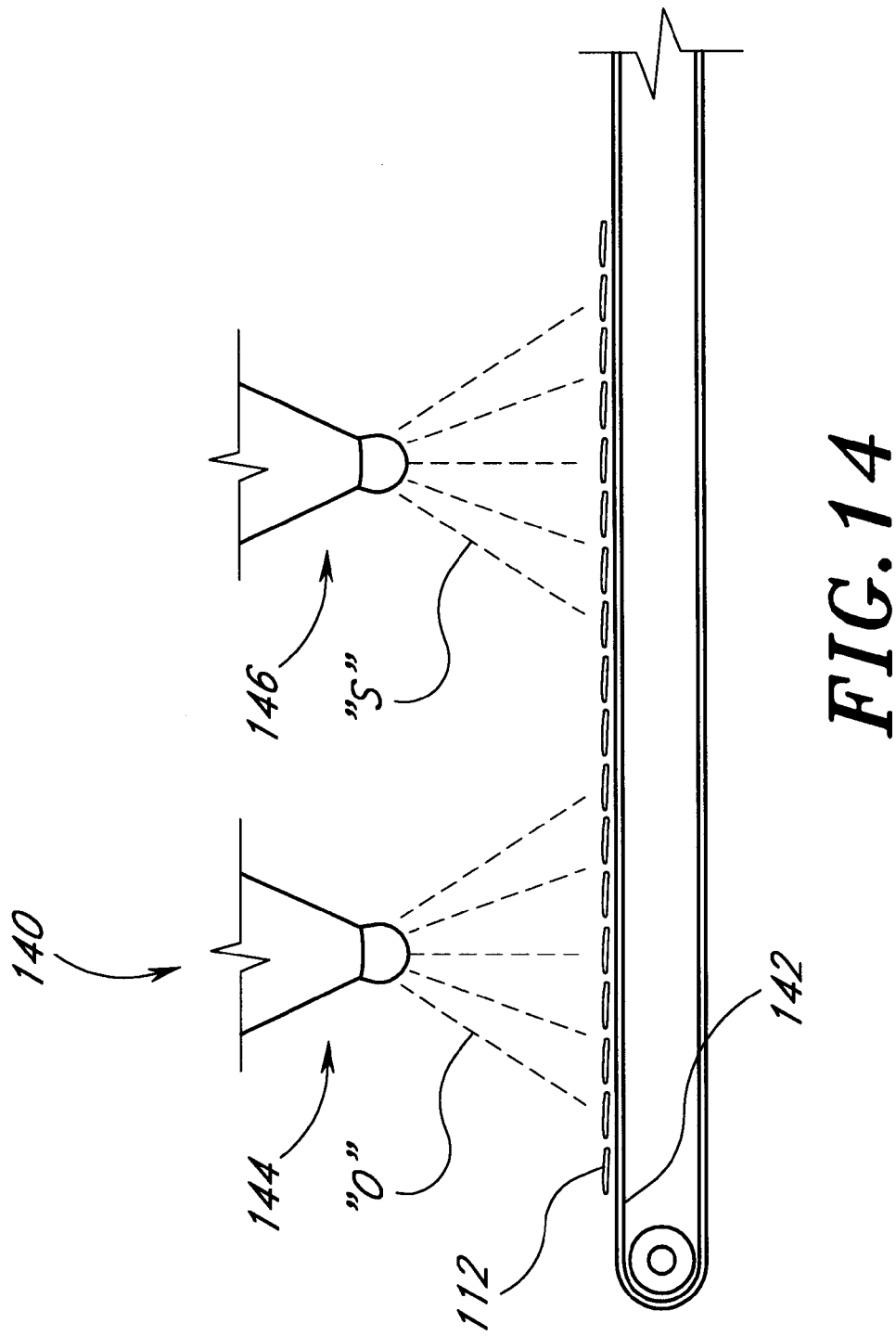
FIG. 14 is a schematic side view of a seasoning apparatus for use in the system of FIG. 1.

FIG. 14 shows an apparatus 140 for oiling and seasoning chips 112 as they pass along a conveyor 142 within one of the processing stations 130. As illustrated, the chips 112 first pass through an oiling apparatus 144 that deposits a layer of liquid such as oil "O" on the chips. The oiled chips then pass through a seasoning apparatus 146 that dispenses a seasoning mixture "S" onto the chips. A drying apparatus can also be provided within one of the processing stations 130. The drying apparatus preferably comprises a multi-conveyor construction similar to that of the first proofer 42 depicted in FIG. 2, and also includes a heat source to facilitate drying of the chips 112. Of course, it is to be understood that any method and apparatus for seasoning and drying the pita chips may be appropriately used. After processing and cooling, the end product is preferably transported to a packaging station 136 where the bread products are packaged for sale.

A number of alternative embodiments of after-oven cutter assemblies can be used to detach the upper and lower layers 82, 84 of the baked flatbread 50 along the edges 86, 88. Additionally, each edge may be cut by hand by holding a blade along the edge as the newly-baked tubular bread moves along the conveyor. In certain embodiments, it may be advantageous to cut only one edge of each tubular baked pita strip instead of cutting both edges. After only one edge is cut, the strip may than be unfolded, effectively creating a single strip twice as wide at the original tubular strip.

Figure 15:
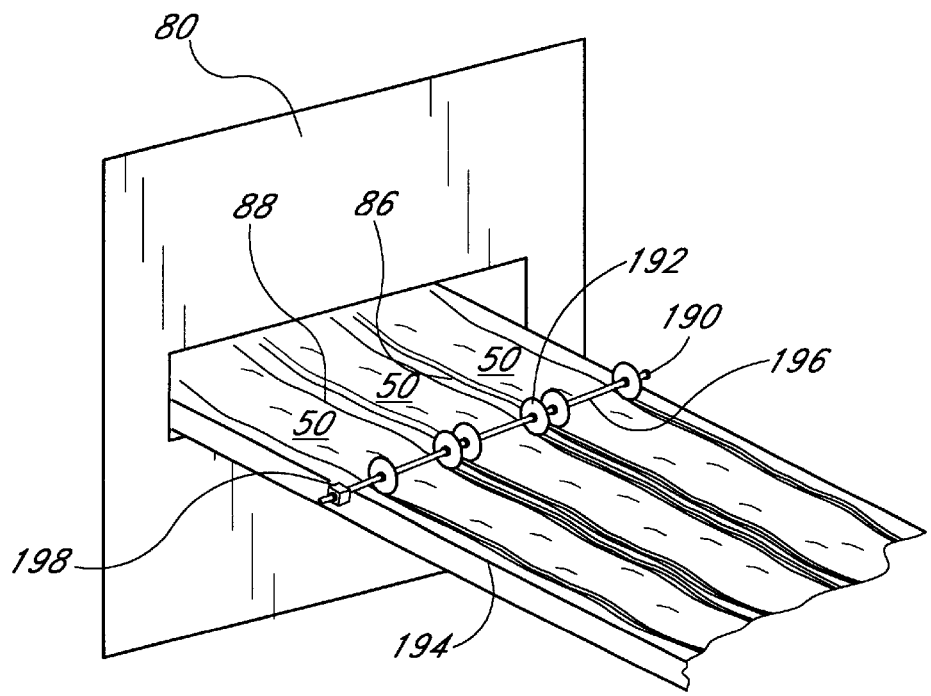
FIG. 15 is a perspective view of another embodiment of the after-oven cutting portion of the system of FIG. 1.
Figure 16:
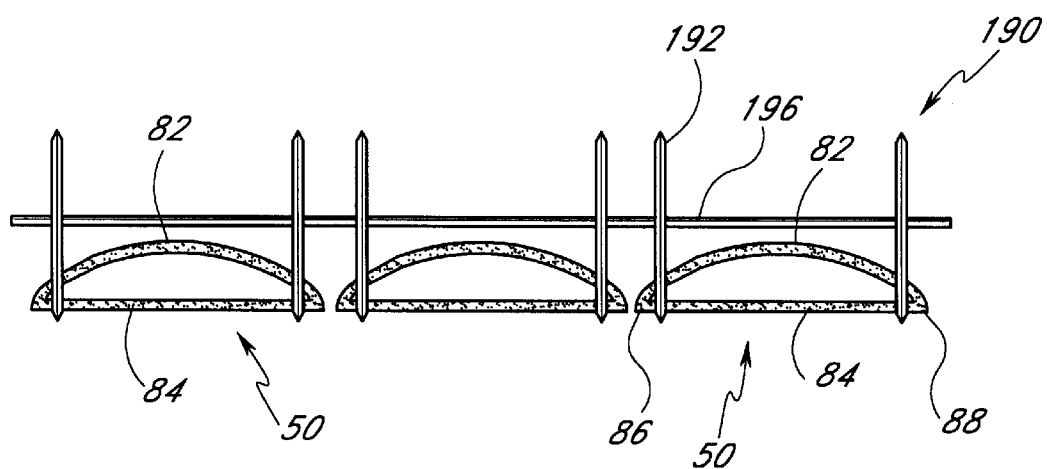
FIG. 16 is an end view of a portion of FIG. 15.

FIGS. 15 and 16 illustrate another embodiment of a cutter assembly 190. In this embodiment, disc-shaped cutters 192 are positioned along the conveyor 194 at a point after the pita bread 50 has been baked in the oven 80. The cutting discs 192 are mounted onto an axle 196 which traverses the conveyor 194 and is journaled within a bearing 198. The bearing 198 linearly fixes the axle 196 in position relative to the conveyor 194. The cutting discs 192 are positioned so as to cut along the edges 86, 88 of the tubular pita bread 50, thus removing the edges and disconnecting the upper layer 82 from the lower layer 84. To ensure proper alignment, alignment members such as those described in connection with FIG. 13 may be employed.

Figure 17:
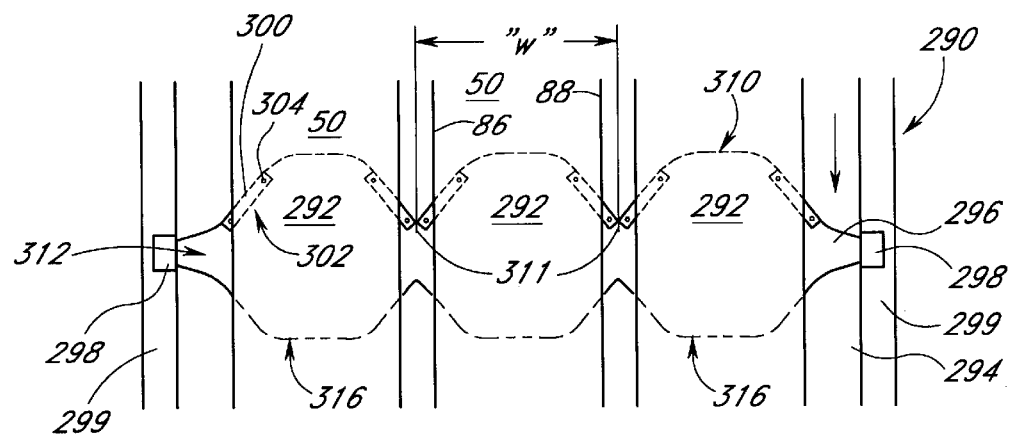
FIG. 17 is a top view of a third embodiment of an after-oven cutting portion of the system of FIG. 1.
Figure 18:
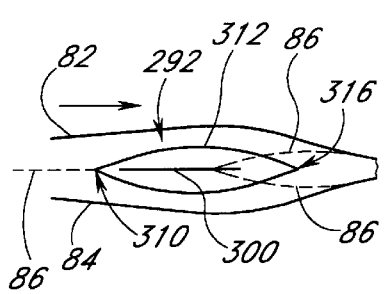
FIG. 18 is a side view of the cutting portion of FIG. 17.
Figure 19:
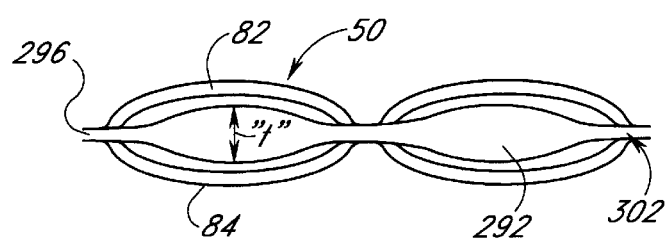
FIG. 19 is a partial end view of the cutting portion of FIG. 17.

FIGS. 17–19 illustrate a still further embodiment of an after-oven cutter assembly 290. The cutting system includes a series of wedges 292, one wedge 292 for each baked tubular pita strip 50. The wedges 292 are preferably connected in series along a crossbar 296 that traverses the conveyor 294. The crossbar 296 is preferably supported by anchors 298 mounted onto the conveyor frame 299. Blades 300 are installed on cutting portions 302 of the wedges 292 and are adapted to contact and cut the edge portions 86, 88 of the tubular baked bread strips 50. The blades 300 are preferably held in position on the wedge cutting portions 302 by fasteners 304 and can be easily replaced as necessary. Each wedge has a leading edge 310 that extends into the inflated tubular strip preferably between about 1–12 inches from the crossbar 296.

As shown in FIG. 17, the wedge 292 tapers behind the leading edge 310 to become progressively wider until contacting an adjacent wedge at an intersect point 311. The wedge cutting portions 302 are preferably arranged between the leading edge 310 and the intersect point 311 and are angularly disposed relative to the conveyor 294 and bread strips 50. Each wedge 292 preferably has a maximum width "w" that is greater than the width of the baked pita strip it is meant to cut. However, the width may be decreased depending upon the thickness of the wedge 292.

As shown in FIG. 18, the wedge 292 also tapers behind the leading edge 310 to become progressively thicker up to a wedge middle portion 312. The maximum preferred thickness "t" of the wedge middle portion 312 at least partially depends upon the width of the corresponding pita strip 50. For example, a 12 inch wide pita strip can be expected to have a maximum diameter of about 8 inches when inflated as a tube. Thus, the wedge would preferably have a middle portion thickness "t" of up to about 8 inches. Most preferably, the thickness "t" is between about 1 inch and half of the maximum diameter of the tubular pita.

In the embodiment illustrated in FIGS. 17–19, the wedges 292 each have a trailing edge 316 behind the middle portion 312. When the pita strip 50 passes the trailing edge 316, the edge portions 86, 88 of the pita strip 50 have already been cut. In the illustrated embodiment, the thickness of the wedge 292 decreases behind the middle point 312, tapering off at the trailing edge 316. However, in alternative embodiments, the trailing edge 316 may have a greater thickness than the middle portion 312. This enables the trailing edge 316 to further separate the upper and lower layers 82, 84 after cutting.

The wedges 292 ensure that the upper and lower layers 82, 84 are separated from each other. The wedges 292 also help align the tubular baked strips 50 so that the cutting portions 302 of each wedge 292 accurately cut the tubular strips along their edges 86, 88. In this manner, the upper layer 82 of pita bread is disconnected from the lower layer 84 of pita bread and the two layers are further separated from each other by the wedge 292.

Since the layers of pita bread slide over the surface of each wedge 292, the wedges are each preferably constructed of a stick-resistant material or coated with a non-stick coating. Such materials include stainless steel, heavy plastics, or Teflon™ coating.

In further alternative embodiments, the leading edge 310 of the wedge 292 may have a sharpened surface or blade disposed thereon. As discussed above, sections of elongated pita strips 50 may have closed ends as they come out of the oven. The leading edge blade would penetrate the front end, allowing the tubular strip to easily fit onto the wedge cutting system.

Although the upper and lower layers 82, 84 of the pita bread separate during baking, there is a possibility that the layers may at least partially re-attach if they are brought into contact with each other when the bread is still moist and hot. Accordingly, in still further embodiments, additional apparatus is contemplated for keeping the upper and lower layers 82, 84 separate from each other until they have cooled enough to ensure they will not reattach.

Figure 20:
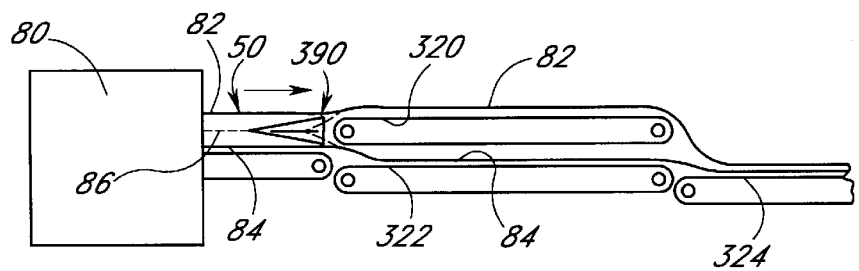
FIG. 20 is a schematic side view of an embodiment of an after-oven portion of the system of FIG. 1.

FIG. 20 discloses an embodiment wherein a wedged cutting apparatus 390 is used to cut tubular pita strips 50 along their edges 86, 88 to separate the upper and lower layers 82, 84. After cutting, the upper layer 82 is directed onto an upper conveyor 320 and the lower layer 84 is directed onto a lower conveyor 322. While on their respective conveyors, the upper and lower layers cool independent of each other. Eventually, the layers 82, 84 are directed to a single exit conveyor 324. The upper and lower conveyors 320, 322 each preferably have sufficient length to enable the upper and lower layers to cool on their respective conveyors for about 5 seconds or more before being reunited on the exit conveyor 324. Additionally, the upper and lower conveyors 320, 322 can be arranged so that the upper and lower layers 82, 84 are deposited on top of each other on the exit conveyor 324, deposited side by side on the exit conveyor, or even directed to separate exit conveyors.

Figure 21:
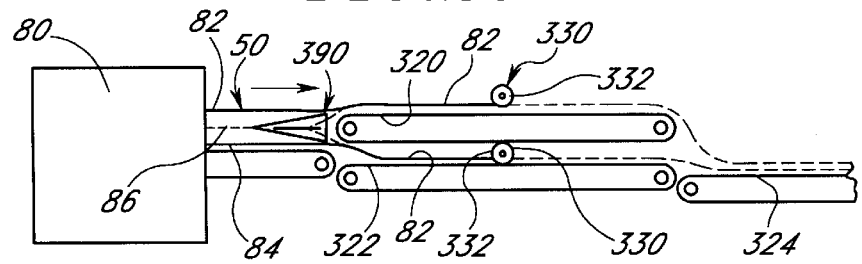
FIG. 21 is another side schematic view of another embodiment of an afteroven portion of the system of FIG. 1.

Further processing can be performed before the upper and lower layers are reunited. For example, in FIG. 21, the apparatus of FIG. 20 is employed, but additionally includes a chopping mechanism 330 on each of the upper and lower conveyors 320, 322. The chopping mechanism 330 is preferably a chip-cutting drum 332 similar to that shown and discussed above with reference to FIGS. 12 and 13. Preferably the pita strips 50 are allowed to cool about 5 seconds or more before being chopped by the chip cutting drum 332. This helps the drum 332 to cleanly cut the pita strips 50 without fouling the mechanism. In this manner, the upper and lower layers 82, 84 are processed separately. The cut snack-sized portions 112 preferably are eventually transported to an exit conveyor 324 for further processing, such as oiling, seasoning and packaging.

Although the elongated strips 50 are preferably between about 8 to 20 inches wide, it is to be understood that wider strips and, in fact, strips extending the entire width of the conveyor, can be employed. Baking an elongated strip having a very large width has the advantage of providing more area of flatbread layers per quantity of edge portion. For example, a single elongated dough strip comprising the entire width of a 60-inch conveyor will produce two very wide pita bread layers, but only two edges.

Figure 5:
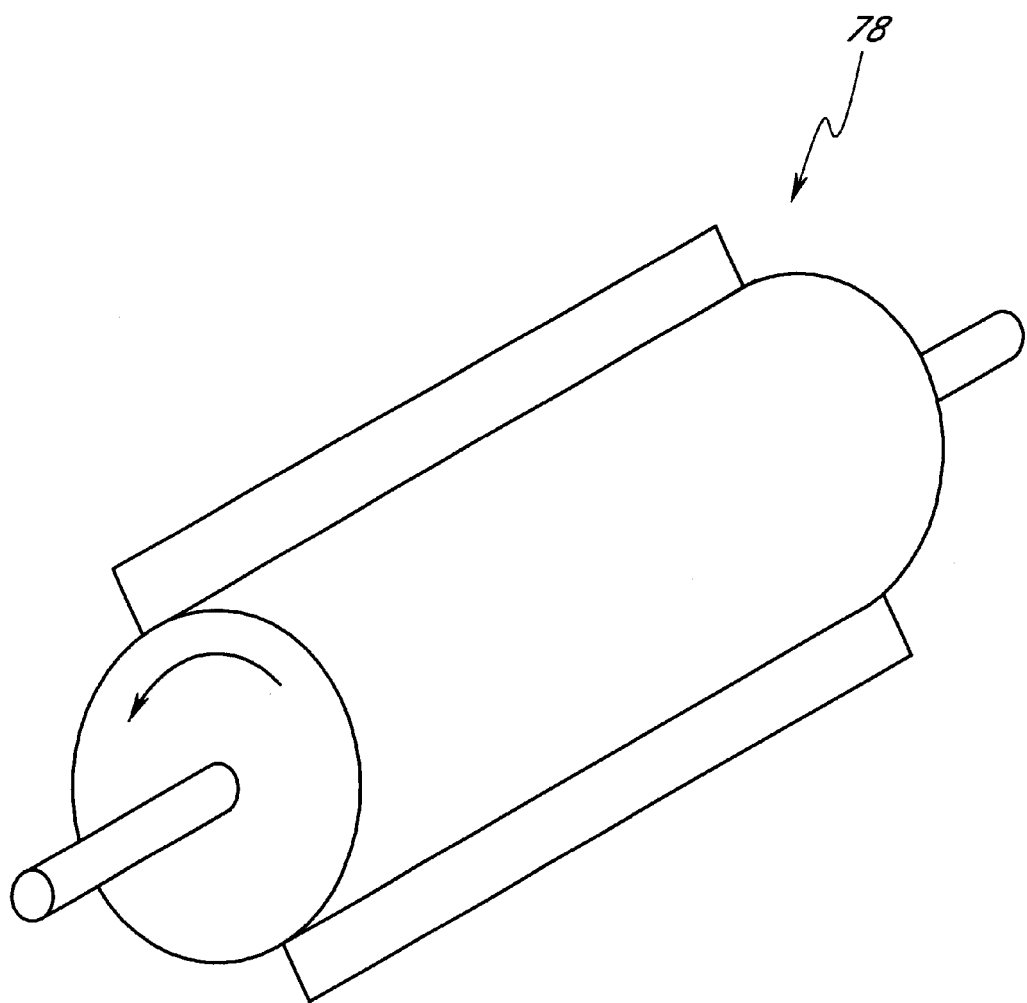
FIG. 5 is a schematic perspective view of a "paddle wheel" type rolling cutter for use with an embodiment of the system of FIG. 1.

In another alternative embodiment, instead of cutting the fully rolled dough 45 into longitudinal portions 50 as discussed above with reference to FIG. 3, the dough 45 is cut transversely by a cutter such as the "paddle wheel" type cutter illustrated in FIG. 5. Such portions preferably maintain the width of the dough 45 on the conveyor and have a length of about 8–20 inches. Additionally, the dough 45 may be both cut longitudinally and transversely. Such processing may produce dough portions having certain size characteristics found to be desirable in further processing. For example, a pita dough portion about 30 inches wide and about 3½–4 feet long has been found to be convenient to work with.

It is to be understood that the present elongated pita dough manufacturing system may be used to create a number of additional products using various methods. For example, the present invention contemplates an elongated rectangular pita bread. Cutting the edges of such an elongated pita bread, especially a pita bread having a relatively large width, would produce two large but very thin sheets of bread. These bread sheets would have characteristics of a traditional lavash bread, but would have one face that is more textured and pliable than the other.

An elongated pita bread could also be used for sandwiches such as "submarine" sandwiches. To prepare such a submarine sandwich pita, the disk-shaped cutters of the dough cutting apparatus 48 are adjusted to cut strips about 2 to 4 inches wide. Prior to entering the oven, the elongated strips are transversely cut to a length that is roughly 3–6 or more times as long as the width of the strip. After baking, the edges can be left uncut. The end result is a rectangular pita sandwich bread much longer than it is wide. Such a sandwich bread can be easily opened to create various types of sandwiches including "submarine" sandwiches. Similarly, the present system is especially suited for manufacturing so called "party subs," which are much longer than they are wide. For example, a rectangular pita having a width of about 4 inches and a length of 2–6 feet or more may be efficiently baked with this method and apparatus.

An elongated pita bread can also be used in a "wrap" type sandwich. For such use, an elongated pita bread is first cut along at least one of the edges to create a thin pliable layer of bread. The thin layer of bread may be cut to any desired size to be used as a wrap for a wrap sandwich. Additionally, the pita bread can be trimmed prior to baking to any size desired for a wrap type sandwich.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A method for making an elongated pita bread, comprising the steps of:
    forming dough into an elongated, flat dough form;
    providing an oven;
    moving the elongated dough through the oven such that baking-induced gases inflate the dough, forming an upper bread layer and a lower bread layer, the layers being connected at first and second edges; and
    cutting the baked dough at or adjacent the first edge so that the upper and lower layers are unattached at or adjacent the first edge.

2. The method of claim 1, further comprising the step of cutting the baked dough adjacent the second edge so that the upper and lower layers are unattached.

3. The method of claim 2, further comprising the step of cutting each layer into multiple portions.

4. The method of claim 3, wherein the multiple portions are bite-sized portions.

5. The method of claim 3, further comprising the steps of drying the multiple portions and applying seasoning to the multiple portions.

6. The method of claim 1, further comprising the step of providing a substantially continuous flow of dough.

7. The method of claim 1, further comprising the steps of providing a dough cutter and cutting the dough into a plurality of elongated strips prior to baking.

8. The method of claim 7, further comprising the step of conveying the plurality of elongated strips side-by-side on a conveyor.

9. The method of claim 1, further comprising the step of separating the upper and lower layers between the first and second edges.

10. A method for making snack-sized portions of pita bread, comprising the steps of:
    providing a dough forming apparatus capable of forming a substantially continuous elongated strip of pita dough;
    providing a proofing apparatus;
    providing an oven;
    forming a substantially continuous elongated pita dough strip having a front end and a rear end;
    baking the elongated pita dough strip in the oven so as to form a baked elongated pita bread strip having an upper bread layer and a lower bread layer; and
    cutting the baked pita bread strip into snack-sized portions.

11. The method of claim 10, wherein the baked pita bread strip is cut into snack-sized portions by a rotary chopper.

12. The method of claim 11 additionally comprising the steps of positioning guides adjacent the chopper and advancing the baked pita bread strip through the guides immediately before advancing the baked pita bread strip through the chopper.

13. The method of claim 10 additionally comprising the step of cutting the elongated dough strip into a plurality of elongated dough strips prior to baking.

14. The method of claim 10 additionally comprising the step of cutting off an edge of the baked elongated pita bread strip.

15. The method of claim 14 additionally comprising the step of cutting off a second edge of the baked elongated pita bread strip.

16. The method of claim 15 additionally comprising the step of separating the upper and lower bread layers.

17. The method of claim 16 wherein the upper and lower bread layers are advanced through a chopper apparatus independently of one another.

18. The method of claim 10 additionally comprising the step of seasoning the snack-sized sized portions.

19. The method of claim 10 additionally comprising the step of drying the snack-sized sized portions.

20. A method for making an elongated pita bread loaf, comprising the steps of:
    substantially continuously forming an elongated pita dough;
    baking the elongated pita dough in an oven so that the elongated dough separates into an upper layer and a lower layer during baking, the upper and lower layers connected at opposing edges; and
    moving the pita dough into and out of the oven to produce an elongated pita bread loaf.

21. The method as in claim 20 additionally comprising the step of trimming the edges to separate the upper and lower layers.

22. It The method as in claim 20 additionally comprising the steps of providing a chopper and chopping the upper and lower layers of the substantially continuous pita bread loaf into snack-sized portions.

23. The method as in claim 20 additionally comprising the step of dividing the pita dough into a plurality of elongated strips.

24. The method as in claim 20, wherein the first and second proofing apparatus each comprise a plurality of conveyor belts positioned and arranged so that the pita dough progresses in a serpentine manner on the conveyor belts, but does not break its continuity.

25. The method as in claim 20 additionally comprising the step of transversely cutting the elongated pita dough.

26. The method as in claim 25, wherein the elongated pita dough is transversely cut after being advanced through the oven.

27. A method for making an elongated pita bread, comprising the steps of:
    forming pita dough into an elongated, flat dough form;
    dividing the elongated, flat dough into a plurality of elongated dough strips; and baking the elongated dough strips in an oven so that each elongated dough strip at least partially inflates into a substantially tubular shape so as to produce an elongated pita bread.

28. The method of claim 27, wherein gases within the dough expand when subjected to heat in the oven so as to inflate the elongated dough.

29. The method of claim 27, wherein each elongated dough strip has a length and a width, and the length is several times greater than the width.

30. The method of claim 27, wherein at least one of the elongated dough strips is divided into an upper layer and a lower layer that are connected to each other at opposing side edges when the elongated dough is inflated.

31. The method of claim 30 additionally comprising cutting the elongated baked pita bread along at least one of the side edges.

32. The method of claim 30 additionally comprising disconnecting the upper layer from the lower layer.

33. The method of claim 32 additionally comprising providing a first exit conveyor and a second exit conveyor, and directing the upper layer onto the first exit conveyor and directing the lower layer onto the second exit conveyor.

34. The method of claim 30 additionally comprising cutting the baked elongated pita bread along the side edges.

35. The method of claim 34 additionally comprising cutting the baked elongated pita bread immediately after it exits the oven when the bread is still warm.

36. The method of claim 30 additionally comprising removing the side edges.

37. The method of claim 27 additionally comprising providing a proofing apparatus, and allowing the elongated dough to rise within the proofing apparatus.

38. The method of claim 27 additionally comprising providing a proofing apparatus, a rolling apparatus, a cutting apparatus, and a conveyor system, wherein the conveyor system transports the dough into and out of the proofing apparatus, the rolling apparatus, the oven, and the cutting apparatus.

39. The method of claim 27 additionally comprising removing surplus dough after dividing the elongate dough into elongate dough strips.

40. The method of claim 27 additionally comprising allowing the baked elongated pita bread to cool, and chopping the cooled bread into bite-sized portions.

41. A method for making an elongated pita bread, comprising the steps of:

forming pita dough into an elongated, flat dough form;

baking the elongated dough in an oven so that the elongated dough at least partially inflates into a substantially tubular shape so as to produce an elongated pita bread; and moving the elongated dough through the oven so that a first portion of the elongated dough exits the oven before a second portion of the elongate dough enters the oven.

42. The method of claim 41 additionally comprising longitudinally cutting the elongated pita bread after the bread exits the oven.

43. The method of claim 41 additionally comprising providing a substantially continuous flow of dough.

44. The method of claim 43, wherein the elongated dough has a front end and a rear end.

\* \* \* \* \*